United States Patent [19]

Banta, III et al.

[11] Patent Number: 5,577,472
[45] Date of Patent: Nov. 26, 1996

[54] SPRING-ENERGIZED CYLINDER HEAD COMBUSTION SEAL ASSEMBLY

[75] Inventors: George L. Banta, III; Andrew P. Harman; Bill L. Stamper, all of Columbus; Steven G. Barnes, Trafalgar, all of Indiana.

[73] Assignee: Cummins Engine Company, Inc., Columbus, Indiana.

[21] Appl. No.: 482,861

[22] Filed: Jun. 7, 1995

[51] Int. Cl.$^6$ .................................................. F16J 15/12
[52] U.S. Cl. ................................... 123/193.3; 277/236
[58] Field of Search ............................. 123/193.2, 193.3, 123/193.1, 193.5; 277/229, 236, 164, 235 R, 235 B

[56] References Cited

U.S. PATENT DOCUMENTS

| | | | |
|---|---|---|---|
| 3,313,553 | 4/1967 | Gastineau | 277/236 |
| 3,433,490 | 3/1966 | Teucher et al. | |
| 3,519,278 | 7/1970 | Fuhrmann et al. | |
| 3,917,294 | 11/1975 | Abbes et al. | 277/236 |
| 4,114,907 | 9/1978 | Abbes et al. | 277/164 |
| 4,218,067 | 8/1980 | Halling | 277/236 |
| 4,369,980 | 1/1983 | Backlin | |
| 4,397,472 | 8/1983 | Czernik | |
| 4,445,694 | 5/1984 | Flaherty | 277/236 |
| 4,480,844 | 11/1984 | Kozerski | |
| 4,508,356 | 4/1985 | Janian | |
| 4,528,959 | 7/1985 | Hauser, Jr. | |
| 4,602,888 | 7/1986 | Court et al. | |
| 4,791,897 | 12/1988 | Udagawa | 123/193.3 |
| 5,112,066 | 5/1992 | Remmerfelt | |
| 5,125,375 | 6/1992 | Vuk | 123/193.3 |
| 5,275,139 | 1/1994 | Rosenquist | 123/193.3 |

OTHER PUBLICATIONS

Dagobert Pfeiffer, "Spring-Energized Metal Seals for Diesel Engines and Turbochargers", *Diesel Progress*, v. 51, p. 32, Apr., 1985.

*Primary Examiner*—Marguerite McMahon
*Attorney, Agent, or Firm*—Woodard, Emhardt, Naughton, Moriarty & McNett

[57] ABSTRACT

A spring-energized cylinder head combustion seal for positioning in an inwardly opening annular groove in a cylinder liner for sealing the interface between the cylinder liner and cylinder head so as to prevent leakage of combustion gases includes a C-shaped annular sheath which is disposed in contact with the bottom surface of the annular groove and the lower surface of the cylinder head. The second component of the seal assembly is a helically wound spring which is of an annular ring shape and disposed within the C-shaped sheath. The sheath and spring are positioned such that the opening in the C-shaped sheath opens directly into the cylinder and the seal assembly is exposed directly to the combustion gases and the higher or elevated temperatures which are present. The spring and C-shaped sheath are constructed of superalloy materials and the exterior of the sheath may be plated with soft metal so as to provide an enhanced metal to metal seal between the liner and cylinder head.

3 Claims, 2 Drawing Sheets

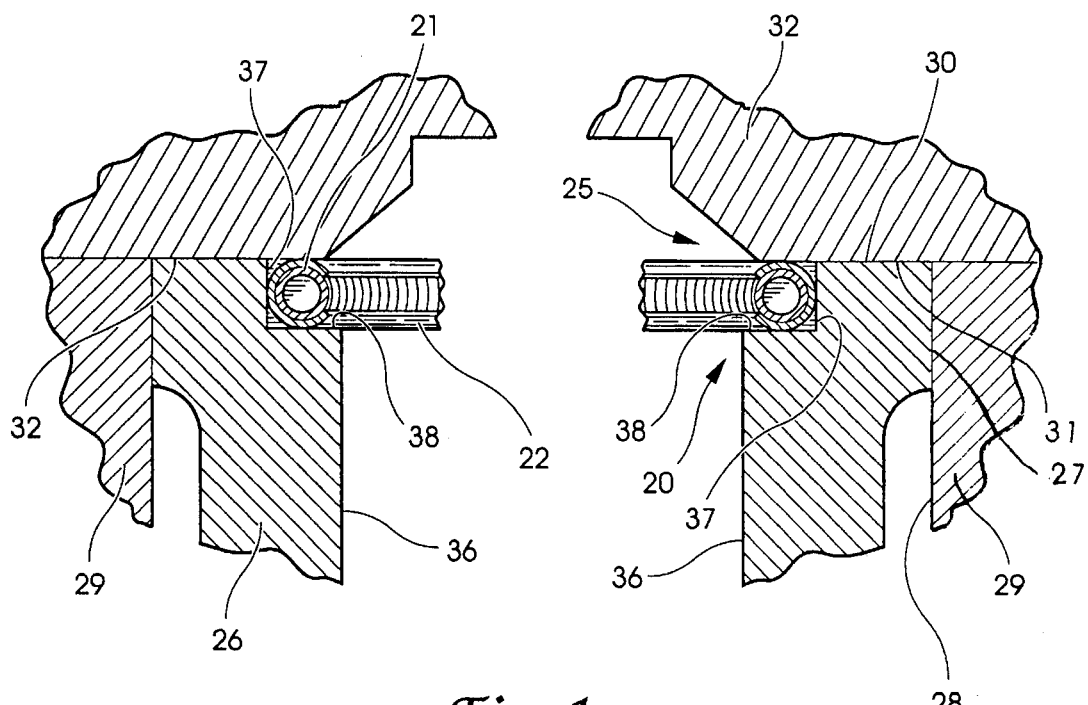
Fig. 1
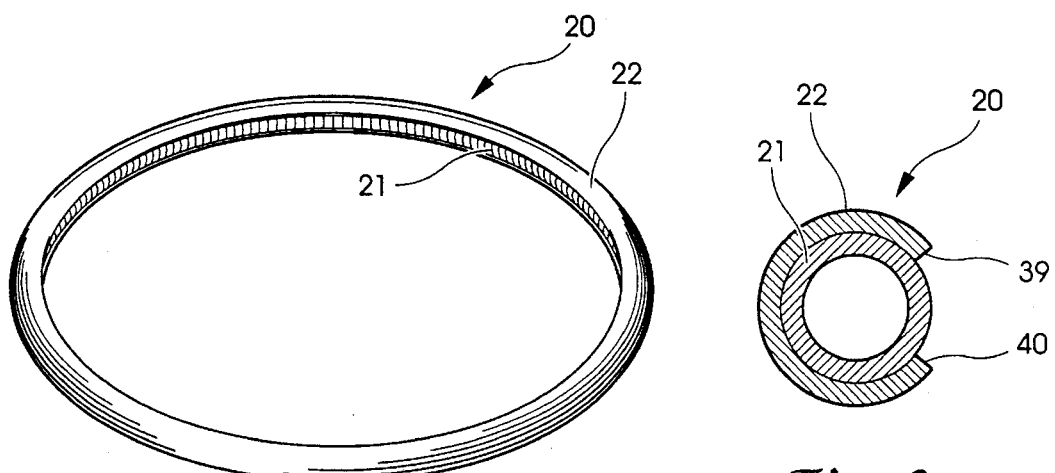
Fig. 2
Fig. 3

SPRING-ENERGIZED CYLINDER HEAD COMBUSTION SEAL ASSEMBLY

BACKGROUND OF THE INVENTION

The present invention relates generally to the interior design of a diesel engine in the area of the cylinder head and cylinder liner. More particularly the present invention pertains to the modified configuration of a cylinder liner and the design of a spring-energized combustion seal which is assembled within the cylinder liner and used to maintain the seal between the cylinder liner and the cylinder head so as to prevent leakage of cylinder combustion gases.

One of the needs in designing an internal combustion engine, such as diesel engine, is to seal the interface around the cylinder bore between the cylinder liner and cylinder head. Currently one means of providing a sealed interface is to use a gasket and fire ring. However, when subjected to the high combustion temperatures and pressures in the cylinder, as experienced by present engines, the gasket and fire ring combination fails (prematurely) during endurance testing. Such testing indicates that a premature failure will likely result during actual engine operation.

One problem revealed to the present inventors during compression testing of existing designs was the nonuniform loading around the circumference of the standard gasket and fire ring combination. In the lightly loaded areas there was a leakage of combustion gases. Since it may be asked whether the problem of leakage can be solved by increasing the bolt clamp loads on the head, the answer is "no". It has been found that an increase in the bolt clamp loads on the head does not improve the sealing due to the fact that the bolts relax at elevated temperatures. Further, it has been found that increased clamp loads can locally yield (deform) the cylinder head.

In order to address the concern and solve the problems of leakage and premature failure, the present inventors have incorporated into the cylinder liner a spring-energized seal, made of a superalloy metal which is positioned in a counterbored groove (two-sided) which is machined into the upper margin of the corresponding cylinder liner. The designed seal is disposed in contact in an axial or vertical direction with both the cylinder liner and the cylinder head. The spring-energized seal and cylinder liner assembly of the present invention creates a tightly sealed interface around the entire circumference of the cylinder liner. Compression testing with the present invention has shown excellent loading around the entire circumference without leakage and without any premature failures. A suitable spring-energized sealing ring for this application may be available from various manufacturers, including Advanced Products Company of North Haven, Conn. However, manufacturers of such sealing rings have not promoted their use in the manner proposed in the present invention.

With the present invention it is possible to maintain the pressure in the cylinder head without leakage. The corresponding clamp load needed to activate the seal is roughly 30 percent lower than is what is required for a gasket and fire ring combination. Due to the fact that high temperature alloys are used in this area of the engine, the spring-energized seal can be located closer to the cylinder liner bore and function at much higher temperatures. Having the spring-energized seal as close as possible to the liner bore allows the designer to control the clearance volume distribution within the combustion chamber (i.e., reduces the amount of dead volume in the combustion chamber at piston top dead center). Structurally, the use of superalloy materials allows the design to function at elevated temperatures. Such materials exhibit far greater strength at high temperatures in the range of 1500° to 2000° F. than do conventional alloys.

An added benefit of having lower clamp loading requirements is a reduction in cylinder liner distortion which improves piston ring sealing. The spring-energized feature of the present invention helps to maintain positive sealing contact between the seal and the mating components during any operating condition.

In the future, the present inventors expect the trend in diesel engine design to be directed towards smaller, more efficient engines. With a low heat rejection engine the need for water cooling the head is eliminated along with all the supporting hardware. The result of requiring less cooling hardware is a lighter engine and more pay load carrying capacity. The lower activation loads required by the spring-energized seal allow the surrounding hardware to be made smaller. Reduced activation load requirements result in smaller diameter cap screws, the mating flange bearing stresses decrease or the bearing areas can be reduced. In addition, with the spring-energized seal located closer to the liner bore, the spacing between cylinder liners can be reduced in the engine block. This allows the overall engine length to be made smaller.

The inventors are aware of a few earlier patents which pertain generally to cylinder head gaskets, sealing rings and spring seals. These earlier patents include the following:

| Patent No. | Patentee | Issue Date |
| --- | --- | --- |
| 3,433,490 | Teucher et al. | March 18, 1969 |
| 3,519,278 | Fuhrmann et al. | July 7, 1970 |
| 4,369,980 | Backlin | Jan. 25, 1983 |
| 4,508,356 | Janian | Apr. 2, 1985 |
| 4,602,888 | Court et al. | Jul 29, 1986 |
| 5,112,066 | Remmerfelt | May 12, 1992 |
| 4,397,472 | Czernik | Aug. 9, 1983 |
| 4,480,844 | Kozerski | Nov. 6, 1984 |
| 4,528,959 | Hauser, Jr. | July 16, 1985 |

While these listed patents pertain generally to the present invention, Teucher et al. does disclose a metal sealing ring including a sheath with a C-shaped cross section and between the arms of the sheath an annular, helically-wound tension spring. In order to compare and contrast the present invention from the Teucher et al. patent disclosure, it is important to recognize and understand that the flat gasket presented by the Teucher et al. disclosure is primarily for sealing combustion gases, lubricant and coolant passageways (5). An important function of sheath (13) is to overlap lug (10) to attach the combustion seal to sheet (11) which seals coolant. In addition, compression of spring (16) is affected by compression of sheet (11).

In contrast, the combustion seal of the present invention does not attach to, or interact with, any other sealing element. The C-shaped outer metal jacket and coiled spring of the present invention are directly exposed to the combustion gases. Without coolant in the cylinder head, the combustion seal of the present invention is exposed to elevated temperatures. Consequently, the components of the present invention are constructed from superalloy materials in order to provide the requisite high strength and corrosion resistance at these elevated temperatures.

The Fuhrmann et al. patent reference is also of interest for its disclosure of a sealing arrangement which includes an annular coil spring surrounded or encased by a sheath. In order to compare and contrast the present invention from Fuhrmann et al., it is important to recognize and understand that while that the Fuhrmann et al. patent disclosure may have some similarity to the present invention it does not disclose nor suggest the unique features which have been developed by the present inventors. Specifically, as is illustrated and described in the Fuhrmann et al. reference, its seal is placed in the block not the cylinder liner and is shielded from the combustion gases. With the Fuhrmann design, the liner/block mating surface inboard of the seal provides some measure of sealing. The seal prevents leakage from occurring across the outboard liner/block mating surfaces. In the present invention the seal is inserted directly into the combustion chamber and the C-shaped configuration opens inwardly towards the center of the cylinder liner (i.e., bore). With the spring-energized seal positioned so it is adjacent to the liner bore, combustion gases are used to activate the seal. The pressure differential across the cross section of the seal forces the top and bottom legs of the sheath outwardly against the top and bottom mating flange surfaces. As is clearly illustrated, referring to either FIG. 1 or FIG. 3 of the Fuhrmann et al. reference, the block radially outwardly of the seal is flush with item 10 which is the cylinder head. Additionally, and more importantly, either the liner (FIG. 1) or the wall of the block which defines the cylinder bore is also flush with item 10 (cylinder head). In the present invention the only block and head portions which are flush to one another are those which are radially outwardly of the combustion seal. Radially inwardly of the combustion seal the cylinder liner is not flush with the cylinder head. It is by this means of construction that the combustion seal of the present invention is exposed to the interior of the combustion cylinder and thus exposed to the combustion gases and directly exposed to the higher temperatures.

The embodiment shown in FIG. 9 involves a coating on the C-shaped sheath: ". . . covering layers 40 and 41 made of an extremely soft material, such as soft rubber . . . ". A notable improvement offered by the present invention is to use a metallic plating of intermediate hardness to withstand the loads and high temperatures at the periphery of a diesel engine combustion chamber.

In view of the function, performance, effectiveness and structural differences and improvements which are provided by the present invention relative to the listed prior patents and in particular Teucher et al. and Fuhrmann et al. the combustion seal assembly of the present invention provides a preferred design.

SUMMARY OF THE INVENTION

A combination of a cylinder liner and a spring-energized cylinder head combustion seal for positioning in an annular groove of the cylinder liner for sealing the inner face between the cylinder liner and cylinder head according to one embodiment of the present invention comprises a C-shaped sheath which is positioned in contact to the annular groove and the cylinder head and a metal spring, helically wound and annular in shape disposed within the C-shaped sheath for spring-energizing the sheath.

One object of the present invention is to provide an improved spring-energized cylinder head combustion seal and cylinder liner combination.

Related objects and advantages of the present invention will be apparent from the following description.

BRIEF DESCRIPTION OF THE DRAWINGS

FIG. 1 is a partial, side elevational view in full section of a spring-energized cylinder head combustion seal positioned in an annular groove in a cylinder liner according to a typical embodiment of the present invention.

FIG. 2 is a perspective view of the FIG. 1 combustion seal.

FIG. 3 is a side elevational view in full section of the FIG. 2 combustion seal.

DESCRIPTION OF THE PREFERRED EMBODIMENT

Figure 4:
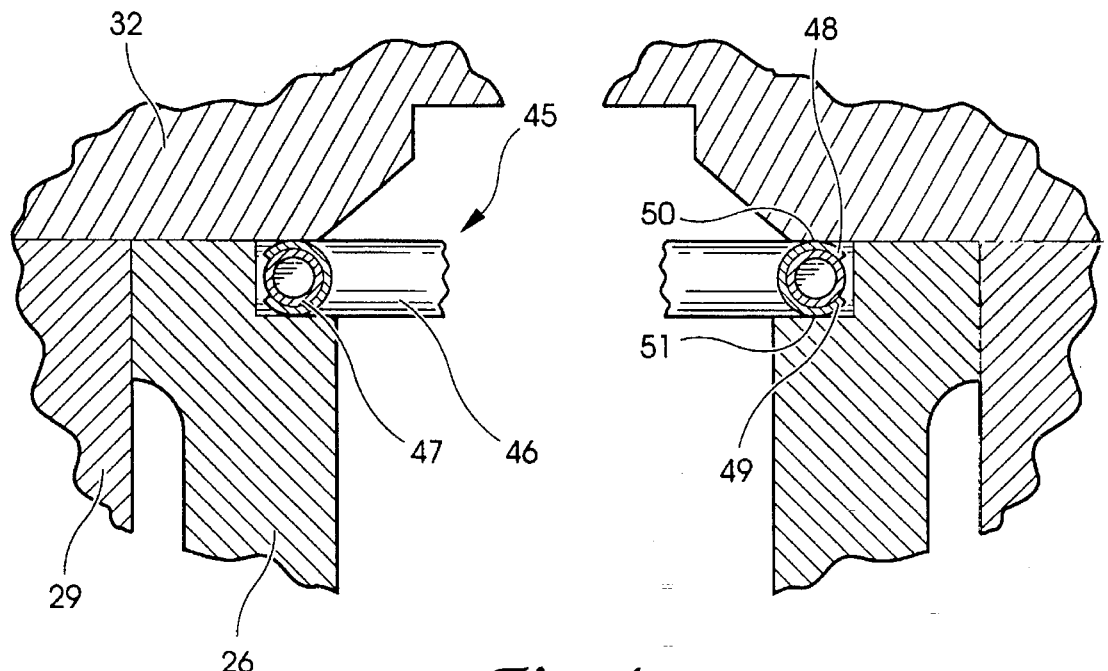
FIG. 4 is a partial, side elevational view in full section of a spring-energized cylinder head combustion seal positioned in an annular groove in a cylinder liner according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a spring-energized, cylinder head combustion seal 20 constructed and installed within a cylinder liner according to the present invention. Combustion seal 20 includes two component parts, an interior helically wound, annular biasing spring 21 and a surrounding annular C-shaped sheath 22. The annular biasing spring has a generally circular lateral cross section. Superalloy materials are selected both for spring 21 and for sheath 22 such that these component parts will have the material strength and corrosion resistant properties which are desired and which will be able to provide the strength and corrosion resistance at elevated temperatures. A suitable spring-energized seal for this application is offered by Advanced Products of North Haven, Conn.

Combustion seal 20 is positioned within annular groove 25 of cylinder liner 26. The outer surface 27 of the liner 26 is positioned up against the bore surface 28 in block 29. The top surface 30 of cylinder liner 26 is positioned up against the lower surface 31 of head 32.

The diameter size of combustion seal 20 is such that it fits radially within groove 25 so that it does not extend inwardly beyond the liner wall 36 nor outwardly so as to be in contact with groove wall 37 upon assembly. This positional relationship of the combustion seal relative to the annular groove means that it is in an unconstrained condition laterally allowing all of the sealing and spring-energized properties for the seal to be generated and function in a vertical or axially direction.

The depth (height) of annular groove 25 from top surface 30 (a surface which is effectively in the same plane as lower surface 31 of head 32) to shelf 38 is a little less than the unrestrained diameter height of seal 20 so as to put the combustion seal 20 in a slightly compressed state. There is an initial preloading of the combustion seal when the cylinder head is assembled onto the block and the assembly bolts are tightened to the desired torque. This puts a slight compression into combustion seal 20 and enables it to provide appropriate and sufficient sealing of the combustion gases during a wide range of operating conditions without premature failure. The compressed condition establishes a sufficient seal between the cylinder liner and cylinder head and compression testing has shown excellent loading around the entire circumference of the cylinder liner using the present invention.

As illustrated, the annular groove 25 opens radially inwardly into the cylinder bore and the combustion seal 20 which is clamped into the groove is directly exposed to the combustion gases. Without coolant in the cylinder head the combustion seal 20 is exposed to elevated temperatures.

The spring 21 is made of Inconel 718 or other superalloy materials and is of a helically wound or garter spring design. The sheath 22 is made of Inconel 718 or other superalloy materials and conforms closely to the exterior surface of spring 21. Spring 21 assists in maintaining positive sealing contact between the seal (sheath 22) and the head and the cylinder liner. The sheath is C-shaped and extends around the lateral cross sectional circumference of the spring for approximately 270 to 300 degrees (see FIGS. 2 and 3). This leaves a 60 to 90 degree arc opening which exposes the spring directly to the interior of the cylinder liner. In the preferred embodiment the arc opening is 60 degrees and this opening faces inwardly thereby exposing the spring 21 directly to the combustion gases. By the combustion seal being connected directly to the combustion chamber it is exposed to the cylinder pressure which acts on the internal surface of the combustion seal thereby increasing the load between the seal and its mating surfaces which are sealed against the escape of combustion gases. With the spring-energized seal 20 positioned so it is adjacent to the liner bore, combustion gases are used to activate the seal. The pressure differential across the cross section of the seal forces the top and bottom legs 39 and 40, respectively, against the mating flange surfaces.

Another feature of combustion seal 20 is the electroplating or coating of the sheath and spring, specifically the exterior surface of the sheath 22 with a soft metal, such as nickel, copper or silver. This soft metal is able to penetrate the surface imperfections in the mating pieces (head and liner) and as a result improves the sealing capability of the seal over a similar design without the soft metal layer.

Referring to FIG. 4, the FIG. 1 arrangement is illustrated with a slight modification. In the FIG. 4 arrangement the orientation of the combustion seal 45 is reversed so that the opening of the C-shaped sheath 46 is directed outwardly rather than inwardly. Otherwise, seal 45 is identical to seal 20 in size, shape and material composition and these similarities apply to both the surrounding annular C-shaped sheath 46 and the helically wound, annular spring 47.

In the FIG. 4 arrangement the combustion gases will have less effect in activating the seal and enforcing the top and bottom legs 48 and 49, respectively, of the sheath 46 outwardly against the mating flange surfaces 50 and 51. However, this design provides greater shielding of the annular spring 47 and helps to reduce the build up of combustion by-products or contaminants on the spring.

Figure 5:
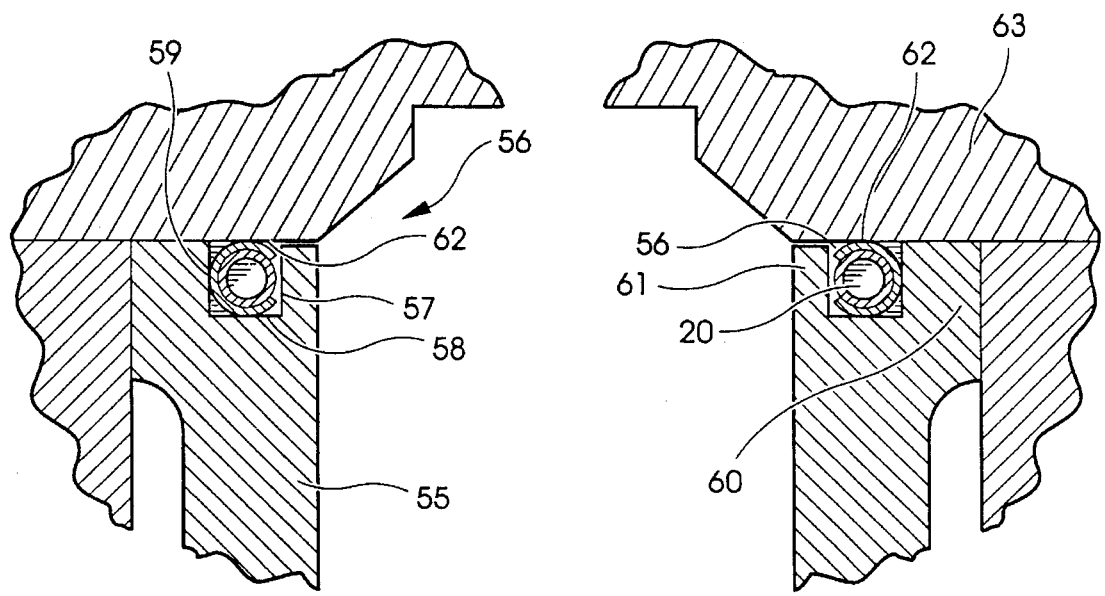
FIG. 5 is a partial, side elevational view in full section of a spring-energized cylinder head combustion seal positioned in an annular groove in a cylinder liner according to a typical embodiment of the present invention.

Referring to FIG. 5 there is illustrated an alternative arrangement of the present invention wherein liner 55 is machined with an annular channel 56 which is defined by surfaces 57, 58 and 59. The two annular sidewalls 60 and 61 of liner 55 which are disposed on opposite sides of channel 56 are of slightly different heights. Sidewall 60 is in tight abutment up against lower surface 62 of head 63 while sidewall 61 is spaced from surface 62 by a small clearance distance. Sidewall 61 which is referred to as a fire dam provides protection for the seal 20, including both the sheath 22 and the spring 21. This fire dam protects the seal from some of the combustion by-products which might otherwise get to the seal. Although the pressure acting upon seal 20 will not change due to the presence of the fire dam, the temperature which the seal 20 sees will be less.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In combination:

a cylinder liner having a means defining a radially inwardly opening, annular groove, said cylinder liner having a top surface which defines an upper boundary of said annular groove and a shelf which defines a lower boundary of said annular groove; and a seal assembly positioned within said annular groove and including a C-shaped annular sheath disposed in contact with said cylinder liner and a helically wound, annular biasing spring disposed within said annular sheath, the unrestrained height of said seal assembly extending beyond said upper boundary top surface when in contact with said lower boundary shelf, wherein said annular biasing spring has a generally circular lateral cross section and said C-shaped annular sheath partially encircles said lateral cross section for less than the complete circumference of said annular biasing spring and wherein said C-shaped annular sheath has means defining an opening, said opening being bounded by a pair of sheath legs, said opening exposing said annular biasing spring to the interior of said cylinder liner.

2. In combination:

a cylinder liner having a means defining an annular groove, said cylinder liner having a top surface which defines an upper boundary of said annular groove and a shelf which defines a lower boundary of said annular groove; and a seal assembly positioned within said annular groove and including a C-shaped annular sheath disposed in contact with said cylinder liner and a helically wound, annular biasing spring disposed within said annular sheath, the unrestrained height of said seal assembly extending beyond said upper boundary top surface when in contact with said lower boundary shelf, wherein said annular biasing spring has a generally circular lateral cross section and said C-shaped annular sheath partially encircles said lateral cross section for less than the complete circumference of said annular biasing spring and wherein said C-shaped annular sheath has means defining an opening, said opening being bounded by a pair of sheath legs, said opening exposing said annular biasing spring to the interior of said cylinder liner.

3. In combination:

a cylinder liner having a means defining an upwardly and radially inwardly opening, annular groove, said cylinder liner having a top surface which defines an upper boundary of said annular groove and a shelf which defines a lower boundary of said annular groove; and a seal assembly positioned within said annular groove and including a C-shaped annular sheath disposed in contact with said cylinder liner and a helically wound, annular biasing spring disposed within said annular sheath, the unrestrained height of said seal assembly extending beyond said upper boundary top surface when in contact with said lower boundary shelf, wherein said annular groove is defined in part by radially inner and outer walls, said outer wall extending to and including said upper boundary top surface and said inner wall extending to a terminating surface which is disposed below said upper boundary top surface.

* * * * *